July 15, 1952     A. H. KING     2,603,107
REDUCTION GEARING
Filed May 21, 1949
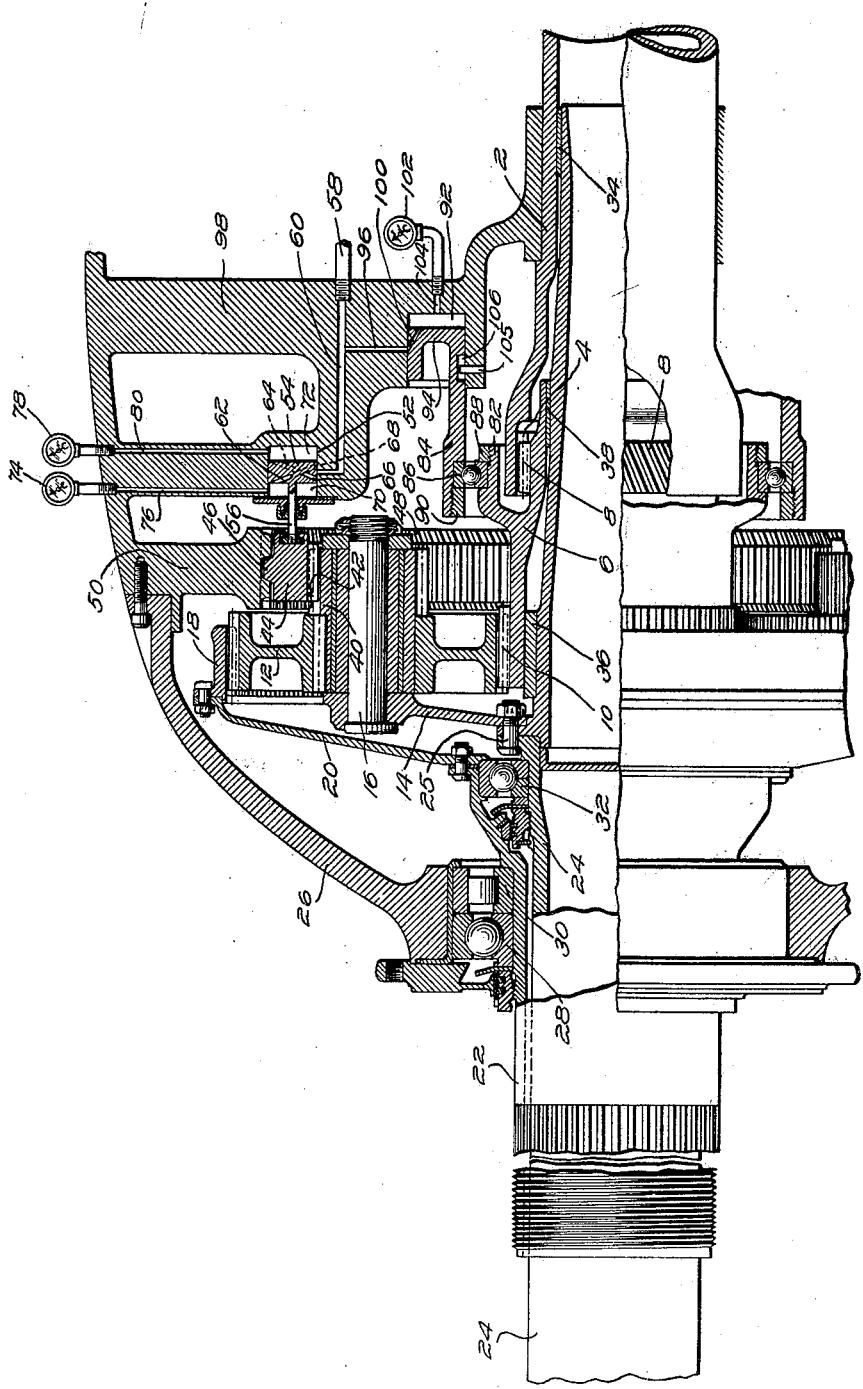
Inventor
Alexander H. King
by Charles Warren
Attorney Patented July 15, 1952

2,603,107

UNITED STATES PATENT OFFICE 2,603,107

REDUCTION GEARING

Alexander H. King, West Hartford, Conn., assignor to United Aircraft Corporation, East Hartford, Conn., a corporation of Delaware Application May 21, 1949, Serial No. 94,696

2 Claims. (Cl. 74—674)

This invention relates to improvements in reduction gearing for driving a single member, and in combined reduction and reversing gearing for driving two coaxial members in opposite directions, at a speed different from the speed of the driving power plant.

It has been proposed in United States Patent No. 2,261,104, issued November 4, 1941, to Birkigt for Means for Driving Two Coaxial Shafts in Opposite Directions, to drive two coaxial shafts in opposite directions by the use of an epicyclic system driven from a sun-wheel and comprising two independent satellite elements mounted loosely on the same axle, one satellite being driven by the driving sun-wheel and running on a fixed set of teeth, the satellite cage being coupled to one driven shaft, and the other satellite running on a second fixed set of teeth and geared with a sun-wheel connected with the other driven shaft.

A feature of this invention is an epicyclic gearing which dispenses with two of the gear elements taught in the Birkigt disclosure and which provides a reduction gearing which is lighter in weight and which also occupies less space.

The invention has particular application to gearing for driving propellers such as used with aircraft power plants. In such an application, the speed reduction between the power plant and the propeller is limited by the relative diameters of the gears comprising the epicyclic system and by the size of the gearing housing. A feature of this invention is a reduction gearing which provides an increased range of reduction gear ratios, while maintaining the size of the system within limits acceptable to aircraft use.

A feature of this invention is an hydraulic system in conjunction with a reaction gear for indicating the load distribution between two coaxial oppositely rotating shafts.

Other features and advantages will be apparent from the specification and claims, and from the accompanying drawing which illustrates an embodiment of the invention.

In the drawing the single figure shows a longitudinal sectional view of the front portion of an aircraft power plant showing a combined reduction and reversing gearing constructed according to the idea of this invention for driving coaxial shafts in opposite directions.

Referring to the drawing in detail, a drive shaft 2 is shown which has an internal helical spline 4 at its forward end. This shaft is part of a power plant, not shown, and drives a sleeve 6 by means of helical splines 8. The sleeve has an integral sun gear 10 meshing with a series of pinions or planet gears 12 carried by a cage 14, the pinions being journaled on pins 16 supported by the cage. The pinions also mesh with an internal ring gear 18 connected as by a bell housing 20 to the outer shaft 22 of the driven member. The cage 14 is connected to the inner shaft 24 by bolts 25 which causes the shaft to rotate in a direction opposite to the shaft 22 by reason of the arrangement of the gears. In an aircraft installation propellers would be mounted on driven shafts 22 and 24.

Outer shaft 22 is supported within casing 26, which houses the reduction gearing unit, by thrust bearing 28 and roller bearing 30. Inner shaft 24 is supported within shaft 22 by bearing 32 and is piloted within shaft 2 by bearing 34. Sleeve 6 is supported by bearings 36 and 38 on the pilot extensions of inner shaft 24.

To assure rotation of shafts 22 and 24 in opposite directions and at the same rate of speed, the pinions 12 are splined to shafts 40 of pinions 42 which mesh with a relatively fixed reaction gear 44. Thus the rate of rotation of the pinions 12 about the axis of the sun gear 10 is limited thereby to control the relative rates of rotation of the two driven shafts 22 and 24.

Reaction gear 44 has an helical spline 46 about its periphery which engages with a corresponding helical spline 48 on the interior flange of casing wall 50. By reason of these splines, the reaction gear will move in an helical path in response to torque developed when the power plant is in operation. Normally this torque would tend to rotate the gear, but, instead, produces an helical movement which is balanced by an hydraulic system including one or more cylinders 52 each containing a piston 54 having a shaft 56 which is connected to the gear so as to permit axial movement of the piston in the cylinder. The system illustrated herein employs a plurality of such hydraulic devices, although only one is shown for simplicity, and is similar to that disclosed in United States Patent No. 2,444,363, issued June 29, 1948, to Newcomb for a Helical Spline Torque Indicator.

The hydraulic system contains fluid under pressure which is supplied to cylinder 52 from conduit 58 and passage 60. Piston 54 is provided with diagonal passages 62 and 64 which have openings 66 and 68 in line with supply passage 60 and which are displaced axially an equal distance from the center plane of the piston. Passages 62 and 64 feed fluid to chambers 70 and 72, respectively, on either side of the piston, the corresponding chambers in each of the cylinders comprising the system being interconnected. Small bleeds, not shown, are located in the system to provide a flow of fluid through the chambers.

The nature of the reduction gearing described above is such that the reaction gear 44 is subject to the input torque and to any difference in torque loading between driven shafts 22 and 24. With the embodiment illustrated, a propeller would be employed on each of these driven shafts, said propellers being of the variable pitch type, and any difference in the torque loading on the shafts due to aerodynamic forces, turbulence, etc., could be balanced by adjusting the pitch of one or both of the propellers.

In operation, assuming the distribution of the torque loading between the shafts to be equal, reaction gear 44 and piston 54 will move to the right with an increase in input torque. This movement will be resisted by the increased fluid pressure in chamber 72 resulting from the additional flow of fluid to the chamber as the area of opening 66 of passage 64, which is metering fluid from passage 60, is enlarged. A balance between the input torque and the fluid pressure is established.

However, when there is an unequal distribution of the torque loading between the driven shafts, gear 44 will be biased to the right or to the left, dependent upon the loading. Since piston 54 will move with the gear, the fluid flow to chambers 70 and 72 will be changed. This change will be reflected in pressure gage 74, connected to chamber 70 by passage 76, and in pressure gage 78 connected to chamber 72 by passage 80. These gages will assist the power plant operator in restoring a balanced loading between the driven members by adjusting the pitch of the propellers thereon. If the unbalance were extreme, it probably would be desirable to reduce the torque being developed by the power plant to avoid excessive loads. If desired, the chambers 70 and 72 could be attached directly to a governor which would automatically adjust propeller pitch to effect a balanced load distribution.

A second hydraulic system is provided which indicates the total torque developed within the reduction gearing. Sleeve 6 is provided with an extension 82 which is connected to a ring 84 by means of bearing 86, the inner race of the bearing being secured to sleeve 6 by nut 88 and the outer race being secured to ring 84 by nut 90. The purpose of this bearing is to permit relative rotational movement between sleeve 6 and ring 84.

As previously described, the connection between drive shaft 2 and sleeve 6 is a helical spline 4. Thus, sleeve 6 will react in the same manner as gear 44 when torque is applied, moving in an axial direction along an helical path. This movement is resisted by hydraulic pressure within chamber 92 acting on piston 94 which is a part of the ring 84. Hydraulic pressure is supplied to this chamber from passage 60 by means of passage 96 in casing wall 98 and metering passage 100 in piston 94.

As the sleeve and the ring carrying the piston are moved to the right with an increase in torque, metering passage 100 permits an increased quantity of oil to be supplied to chamber 92, resisting the movement. Gage 102 is connected to chamber 92 by passage 104 and reflects a change in the pressure within chamber 92 which indicates to the operator the torque being developed by the power plant. To provide simplicity of operation, gages 74, 78, and 102 should be calibrated in terms of torque in order that quick comparisons could be made. A small bleed, not shown, provides a flow of fluid through the system. Pin 105 acting in groove 106 prevents rotary movement of piston 94.

While the drawing illustrates the use of this invention in conjunction with driving two co-axial shafts in opposite directions, it is apparent that the invention is equally applicable to a reduction gearing for a single driven shaft. By omitting internal ring gear 18, bell housing 20, bearing 32, and outer shaft 22, one system is produced. Since the desire for maintaining an equal load distribution between the two driven shafts no longer exists, the hydraulic system in connection with reaction gear 44 could be dispensed with. An alternative arrangement, since the reaction gear 44 would be subject to the full torque loading, would be to eliminate the hydraulic system in connection with sleeve 6 and ring 84 and to retain the system comprising the reaction gear 44 although one of the chambers, such as 70 and its associated passages, could be omitted.

Another single rotation system utilizing the invention in which system the propeller is rotating in an opposite direction to that of the driving member could be produced by eliminating driven shaft 24, bolts 25, bearing 32 and that part of cage 14 which is connected to and drives shaft 24. In this system the driven shaft 22 probably would be piloted within shaft 2 by an extension similar to that illustrated in connection with shaft 24.

It is to be understood that the invention is not limited to the specific embodiment herein illustrated and described, but may be used in other ways without departure from its spirit as defined by the following claims.

I claim:

1. In a combined reversing and reduction gearing for transmitting power from a single drive shaft to a pair of co-axial oppositely rotating driven shafts, planetary gearing comprising essentially a sun gear mounted on the driving shaft, a plurality of pairs of satellite pinions, said pinion pairs being co-axial and drivingly connected to each other, a cage supporting said pinion pairs and connected to one of said driven shafts, an internal ring gear connected to the other of said driven shafts, said sun gear and said ring gear meshing with one of said planetary pinion pair, a reaction gear meshing with the other of said pinion pair and having helical splines on its outer diameter, a stationary member having helical splines meshing with those on said reaction gear, said reaction gear being capable of axial movement in the course of said helical splines, hydraulic means restraining axial movement of said reaction gear and means for indicating the tendency of said reaction gear to move in either direction along its axis.

2. In a combined reversing and reduction gearing for transmitting power from a single drive shaft to a pair of coaxial driven shafts turning in opposite directions at a speed less than the speed of the drive shaft, a sleeve subject to reaction torque and driven by said drive shaft, an helical spline connection between said sleeve and said drive shaft, a sun gear carried by said sleeve, a cage carried by one of said driven shafts, an internal ring gear carried by the other of said driven shafts, a plurality of pairs of planetary pinions coaxial with each other and carried by said cage, one set of said pairs meshing with said sun gear and said ring gear, a relatively fixed gear subject to reaction torque and meshing with the second set of pinions, a stationary member having helical splines cooperating with similar splines on the periphery of said reaction gear such that torque tending to rotate said reaction gear will move it in the course of such splines, means restraining movement of said reaction gear in either direction along its axis, means connected to said restraining means for indicating the torque loading on said reaction gear, means restraining the helical movement of said sleeve, and means connected to said last mentioned restraining means for indicating the torque loading on said sleeve.

ALEXANDER H. KING.

REFERENCES CITED

The following references are of record in the file of this patent:

UNITED STATES PATENTS

| Number | Name | Date |
|---|---|---|
| 1,730,270 | Friedell | Oct. 1, 1929 |
| 1,902,374 | Pirinoli | Mar. 21, 1933 |
| 2,386,367 | Taylor | Oct. 9, 1945 |
| 2,444,363 | Newcomb | June 29, 1948 |
| 2,496,857 | Cronstedt et al. | Feb. 7, 1950 |

FOREIGN PATENTS

| Number | Country | Date |
|---|---|---|
| 174,726 | Great Britain | Jan. 30, 1922 |